(12) United States Patent
Kamo et al.

(10) Patent No.: US 11,292,576 B2
(45) Date of Patent: Apr. 5, 2022

(54) METHOD OF DESIGNING COMPOSITE MATERIAL, METHOD OF EVALUATING COMPOSITE MATERIAL, AND COMPOSITE MATERIAL

(71) Applicant: MITSUBISHI HEAVY INDUSTRIES, LTD., Tokyo (JP)

(72) Inventors: Sota Kamo, Tokyo (JP); Kiyoka Takagi, Tokyo (JP); Tooru Shitani, Tokyo (JP); Toshio Abe, Nagoya (JP); Sae Obata, Tokyo (JP); Kosuke Takahashi, Sapporo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 460 days.

(21) Appl. No.: 16/059,207

(22) Filed: Aug. 9, 2018

(65) Prior Publication Data

US 2019/0055001 A1 Feb. 21, 2019

(30) Foreign Application Priority Data

Aug. 17, 2017 (JP) .............................. JP2017-157393

(51) Int. Cl.
*B32B 3/02* (2006.01)
*B32B 5/12* (2006.01)
(Continued)

(52) U.S. Cl.
CPC .............. *B64C 3/20* (2013.01); *B29C 70/202* (2013.01); *B29C 70/207* (2013.01); *B29C 70/30* (2013.01);
(Continued)

(58) Field of Classification Search
CPC .... B32B 3/02; B32B 5/12; B32B 5/26; B32B 5/28; B64C 1/00; B64C 3/20; B64C 3/26; B64C 2001/0072
See application file for complete search history.

(56) References Cited

U.S. PATENT DOCUMENTS

| | | | |
|---|---|---|---|
| 6,372,072 B1 * | 4/2002 | Healey | ...................... B32B 5/26 156/148 |
| 8,201,371 B2 | 6/2012 | Kismarton | |

(Continued)

FOREIGN PATENT DOCUMENTS

| | | |
|---|---|---|
| JP | 2011-506774 | 3/2011 |
| JP | 2012-176614 | 9/2012 |
| JP | 2013-532075 | 8/2013 |

OTHER PUBLICATIONS

Office Action dated Jun. 8, 2021 in Japanese Patent Application No. 2017-157393, with English-language translation.

*Primary Examiner* — Joanna Pleszczynska
(74) *Attorney, Agent, or Firm* — Wenderoth, Lind & Ponack, L.L.P.

(57) ABSTRACT

A composite material includes stacked reinforced fiber substrates and has a thickness-varying part whose thickness in a stacking direction changes from a large thickness to a small thickness. The reinforced fiber substrate that has the drop-off portion and is positioned between a base substrate and a cover substrate in the stacking direction is set as a cut substrate. Stress analysis is performed on the base substrate, the cut substrate, and the cover substrate to calculate an evaluation value concerning stress on the cut substrate. A reinforced fiber substrate in the thickness-varying part is set at the cut substrate, based on the calculated evaluation value.

15 Claims, 7 Drawing Sheets

(51) Int. Cl.
  *B32B 5/26* (2006.01)
  *B64C 1/00* (2006.01)
  *B64C 3/20* (2006.01)
  *B64C 3/26* (2006.01)
  *B64C 1/26* (2006.01)
  *B64C 1/06* (2006.01)
  *B29C 70/30* (2006.01)
  *B29C 70/54* (2006.01)
  *B29C 70/20* (2006.01)
  *G06F 30/00* (2020.01)
  *G06F 30/15* (2020.01)
  *G06F 113/24* (2020.01)
  *G06F 113/26* (2020.01)

(52) U.S. Cl.
  CPC .......... *B29C 70/305* (2013.01); *B29C 70/541* (2013.01); *B64C 1/00* (2013.01); *B64C 1/063* (2013.01); *B64C 1/26* (2013.01); *B64C 3/26* (2013.01); *G06F 30/00* (2020.01); *B64C 2001/0072* (2013.01); *G06F 30/15* (2020.01); *G06F 2113/24* (2020.01); *G06F 2113/26* (2020.01)

(56) References Cited

U.S. PATENT DOCUMENTS

| | | | |
|---|---|---|---|
| 8,870,120 B2 * | 10/2014 | Sanderson | B64C 3/26 244/123.3 |
| 2010/0219294 A1 | 9/2010 | Kismarton | |
| 2010/0300920 A1 | 12/2010 | Wagner et al. | |
| 2011/0045232 A1 * | 2/2011 | Kismarton | B29C 70/228 428/113 |
| 2012/0213640 A1 | 8/2012 | Sanderson et al. | |

* cited by examiner

* STRENGTH RATIO WHERE
CONVENTIONAL STRENGTH IS 1.

METHOD OF DESIGNING COMPOSITE MATERIAL, METHOD OF EVALUATING COMPOSITE MATERIAL, AND COMPOSITE MATERIAL

CROSS-REFERENCE TO RELATED APPLICATIONS

The present application claims priority to and incorporates by reference the entire contents of Japanese Patent Application No. 2017-157393 filed in Japan on Aug. 17, 2017.

FIELD

The present invention relates to a method of designing a composite material formed by stacking a plurality of reinforced fiber substrates, a method of evaluating a composite material, and a composite material.

BACKGROUND

As a method of designing a composite material formed by stacking a plurality of reinforced fiber substrates, a method of designing a composite panel is known, which optimizes the orientation angle of laminate plies having different orientations (for example, see Japanese Unexamined Patent Application Publication (Translation of PCT Application) No. 2011-506774).

For example, a plate-shaped composite material formed by stacking a plurality of reinforced fiber substrates has a tapered plate thickness-varying part (thickness-varying part) in which the thickness in the stacking direction changes from a large thickness to a small thickness. The plate thickness-varying part includes a fiber reinforced substrate having a drop-off portion that is an end portion cut along the stacking direction. In general, when a plate thickness-varying part is formed, fiber reinforced substrates having drop-off portions are stacked stepwise (in the shape of a pyramid) such that the drop-off portions of the fiber reinforced substrates are positioned from the lower layer to the upper layer in the stacking direction from the thin side to the thick side.

Here, stress is likely to concentrate in the plate thickness-varying part. When the fiber reinforced substrates having drop-off portions are stacked stepwise, the amount of change in the plate thickness-varying part is moderated in order to alleviate concentration of stress applied to the plate thickness-varying part. That is, the length in the direction from a large thickness to a small thickness is increased relative to the height in the stacking direction so that the taper ratio (height in the stacking direction: length in the direction from a large thickness to a small thickness) of the tapered shape of the plate thickness-varying part is moderate.

However, if the amount of change in the plate thickness-varying part is moderate, the thick part is formed excessively compared with when the amount of change in the plate thickness-varying part is steep, leading to weight increase of the composite material. On the other hand, if the fiber reinforced substrates having drop-off portions are stacked stepwise such that the amount of change in the plate thickness-varying part is steep (increased), the strength decreases and the effect of stress on the plate thickness-varying part increases.

An object of the present invention is to provide a method of designing a composite material, a method of evaluating a composite material, and a composite material, which can increase the amount of change in the thickness-varying part to reduce the weight of the thickness-varying part while improving the strength of the thickness-varying part.

SUMMARY OF THE INVENTION

A method of designing a composite material of the present invention is a method of designing a composite material in which a plurality of reinforced fiber substrates are stacked. The composite material has a thickness-varying part whose thickness in a stacking direction changes from a large thickness to a small thickness. The thickness-varying part includes a fiber reinforced substrate having a drop-off portion that is an end portion cut along the stacking direction. The method includes setting, as a cut substrate, the reinforced fiber substrate that has the drop-off portion and is positioned between a base substrate and a cover substrate in the thickness-varying part, the base substrate being one of the reinforced fiber substrates overlapping in the stacking direction, the cover substrate being a reinforced fiber substrate opposed to the base substrate in the stacking direction; performing stress analysis on the base substrate, the cut substrate, and the cover substrate to calculate an evaluation value concerning stress on the cut substrate; and setting, as the cut substrate, a reinforced fiber substrate in the thickness-varying part, based on the calculated evaluation value.

With this configuration, an evaluation value for the cut substrate can be calculated by performing stress analysis of the base substrate, the cut substrate, and the cover substrate, and a predetermined reinforced fiber substrate can be set as the cut substrate based on this evaluation value. Therefore, the strength in the thickness-varying part can be improved, for example, by setting the reinforced fiber substrate to which stress is less likely to concentrate as a cut substrate, or by setting the reinforced fiber substrate with small shearing stress as a cut substrate. Here, the amount of change in the thickness-varying part can be increased by the amount corresponding to the improved strength, that is, the thickness of the thickness-varying part can be reduced, leading to weight reduction of the composite material.

In the first setting, for the stacked reinforced fiber substrates, a plurality of stacked structures each including the base substrate, the cut substrate, and the cover substrate may be set. In the performing stress analysis, for the set stacked structures, the evaluation value may be calculated based on a variable including a degree of stress concentration on the cut substrate in each of the stacked structures. In the second setting, a predetermined reinforced fiber substrate in the thickness-varying part may be set as the cut substrate, based on a plurality of the evaluation values.

With this configuration, when the thickness-varying part includes a plurality of cut substrates, a plurality of cut substrates can be set in a plurality of reinforced fiber substrates, based on a plurality of evaluation values. This configuration can alleviate stress concentration in the thickness-varying part.

In the first setting, for the stacked reinforced fiber substrates, a plurality of stacked structures each including the base substrate, the cut substrate and the cover substrate may be set. In the performing stress analysis, for the set stacked structures, a magnitude of shearing stress on the cut substrate in each of the stacked structures may be calculated as the evaluation value. In the second setting, a predetermined reinforced fiber substrate in the thickness-varying part may be set as the cut substrate, the stacked structure may be changed by setting of the cut substrate, a sum value may be calculated by summing the evaluation values of the stacked structures after change, a plurality of the sum values of the stacked structures after change may be calculated while a predetermined reinforced fiber substrate set as the cut substrate is changed, a predetermined reinforced fiber substrate corresponding to the sum value smaller than a preset threshold among the sum values may be selected as the cut substrate, and a predetermined reinforced fiber substrate corresponding to the evaluation value larger on a thick side than on a thin side in the selected cut substrate may be selected as the cut substrate.

With this configuration, when the thickness-varying part includes a plurality of cut substrates, a plurality of cut substrates that can reduce the evaluation value of shearing stress as a whole can be selected. In addition, the one with a large evaluation value of the selected cut substrates can be arranged on the thick side. This configuration can improve the shear strength of the thickness-varying part.

In the second setting, when the evaluation values include an identical evaluation value, a distance between a position of the drop-off portion of the cut substrate previously set and a position of the drop-off portion of the cut substrate in the stacked structure corresponding to the identical evaluation value may be compared to select and set the cut substrate with the distance that is larger.

With this configuration, the position of the drop-off portion in the cut substrate previously set can be spaced apart from the position of the drop-off portion of the cut substrate set this time. The drop-off portions to which stress is likely to concentrate are spaced apart from each other, thereby improving the strength of the drop-off portion.

A method of evaluating a composite material of the present invention is a method of evaluating a composite material in which a plurality of reinforced fiber substrates are stacked. The composite material has a thickness-varying part whose thickness in a stacking direction changes from a large thickness to a small thickness. The thickness-varying part includes a fiber reinforced substrate having a drop-off portion that is an end portion cut along the stacking direction. The method includes setting, as a cut substrate, the reinforced fiber substrate that has the drop-off portion and is positioned between a base substrate and a cover substrate in the thickness-varying part, the base substrate being one of the reinforced fiber substrates overlapping in the stacking direction, the cover substrate being a reinforced fiber substrate opposed to the base substrate in the stacking direction; and performing stress analysis on the base substrate, the cut substrate, and the cover substrate to calculate an evaluation value concerning stress on the cut substrate.

With this configuration, the evaluation value for the cut substrate can be calculated by performing stress analysis of the base substrate, the cut substrate, and the cover substrate. The effect of stress on the existing composite material thus can be evaluated.

A composite material of the present invention is a composite material in which a plurality of reinforced fiber substrates are stacked. The composite material includes a thickness-varying part whose thickness in a stacking direction changes from a large thickness to a small thickness. The thickness-varying part includes a plurality of cut substrates each being the reinforced fiber substrate having a drop-off portion that is an end portion cut along the stacking direction. The thickness-varying part is formed by stacking the reinforced fiber substrates including the cut substrates. The drop-off portions of the cut substrates have a positional relation such that, in a direction from a thick side to a thin side of the thickness-varying part, one or more of the reinforced fiber substrates are interposed in the stacking direction between the drop-off portion on the thick side and the drop-off portion on the thin side adjacent to the drop-off portion on the thick side. The positional relation holds in all of the drop-off portions.

This configuration provides a composite material with a smaller weight while the strength in the thickness-varying part is improved.

The reinforced fiber substrate may be a ply substrate having a fiber direction aligned in one direction. In a plane orthogonal to the stacking direction, an angle formed between a reference direction serving as a reference and the fiber direction of the ply substrate may be an orientation angle. The composite material may include a one-side stacked structure including the reinforced fiber substrates stacked on one side with respect to a center line passing through center in the stacking direction; and an other-side stacked structure including the remaining reinforced fiber substrates stacked on the other-side with respect to the center line. The one-side stacked structure and the other-side stacked structure may be a symmetric stack in which the orientation angle of the reinforced fiber substrates is symmetric about the center line. The drop-off portions of the cut substrates may be alternately disposed in the one-side stacked structure and the other-side stacked structure in a direction from the thick side to the thin side of the thickness-varying part.

With this configuration, when the composite material is a symmetric stack, the drop-off portions (cut ends) likely to suffer stress concentration can be spaced apart from each other, thereby improving the strength of the drop-off portions.

The composite material may include a thin part on the thin side of the thickness-varying part; and a thick part on the thick side of the thickness-varying part. A section in which a thickness of the thin part extends to the thick part may be a baseline. The cut substrate may be included in the baseline.

With this configuration, since the drop-off portion in the cut substrate can be provided in the baseline, the drop-off portions of the cut substrates can be provided over the entire thickness-varying part.

DESCRIPTION OF EMBODIMENTS

Embodiments of the present invention will be described in detail below with reference to the figures. It should be noted that the present invention is not limited by those embodiments. The components in the embodiments below include those easily replaceable by those skilled in the art or those substantially identical. The components described below can be combined as appropriate, and when there are more than one embodiments, the embodiments can be combined.

First Embodiment

Figure 1:
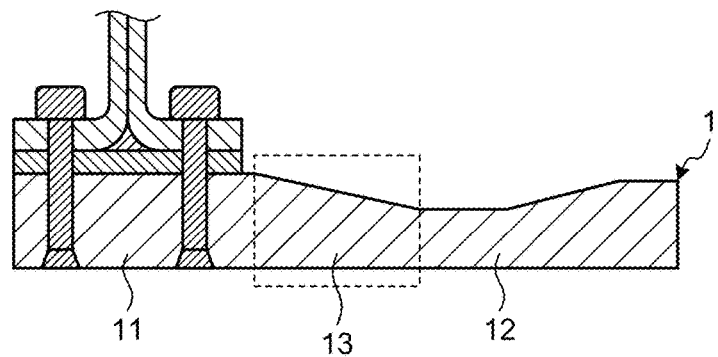
FIG. 1 is a cross-sectional diagram schematically illustrating an exemplary composite material for a method of designing a composite material according to a first embodiment.
Figure 2:
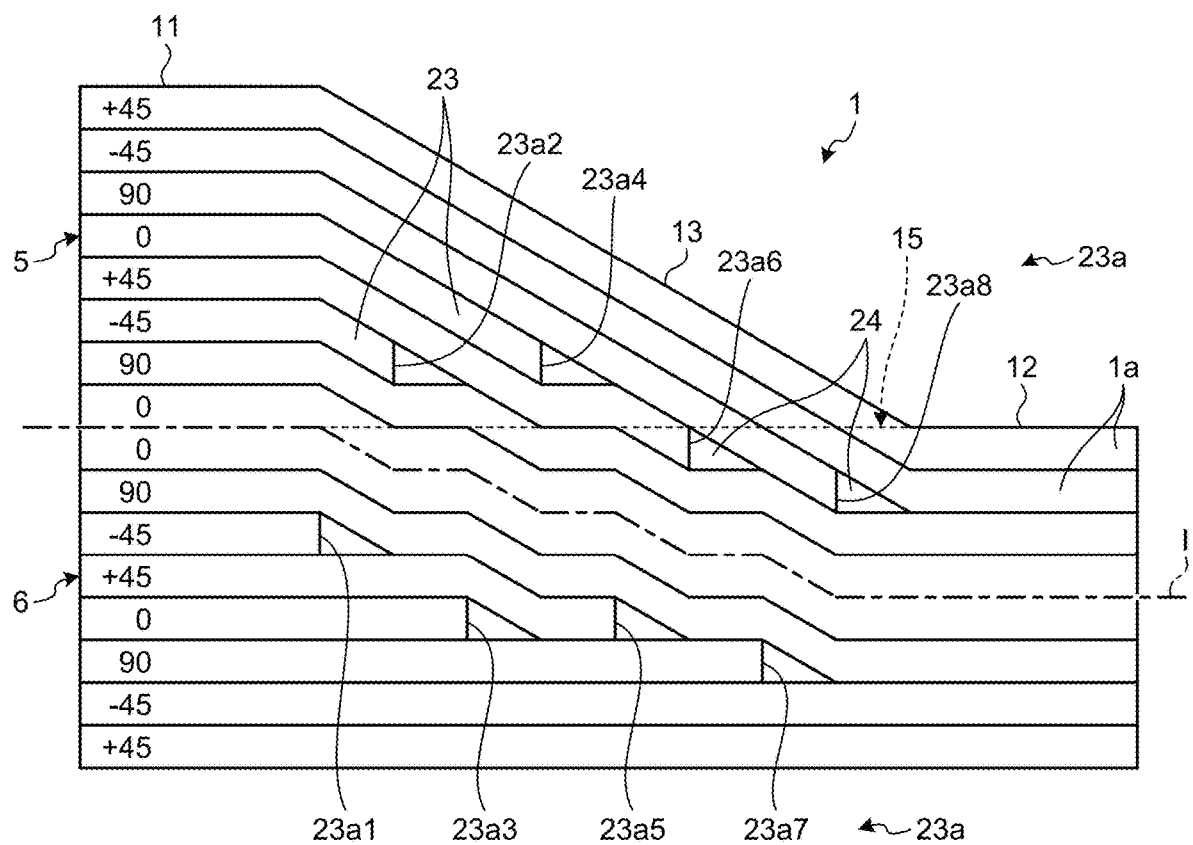
FIG. 2 is a cross-sectional diagram illustrating stacked structures of a composite material according to the first embodiment.
Figure 3:
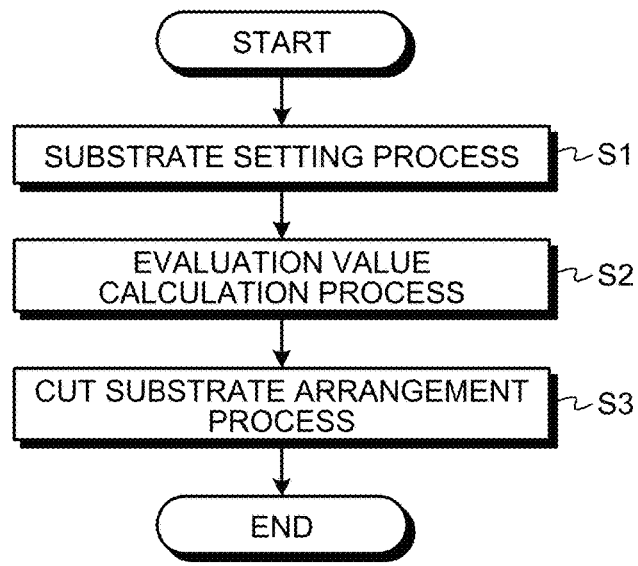
FIG. 3 is a flowchart of the method of designing a composite material according to the first embodiment.
Figure 4:
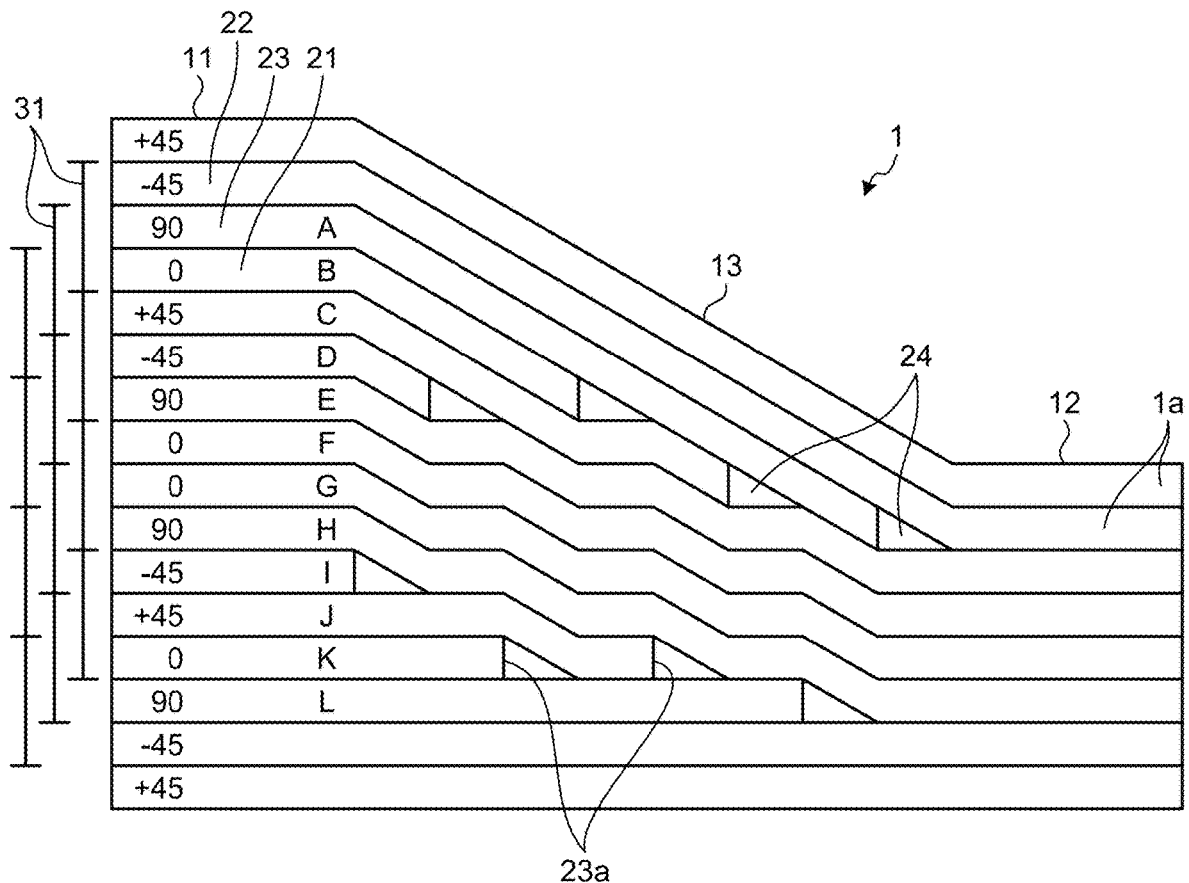
FIG. 4 is an exemplary illustration of the method of designing a composite material according to the first embodiment.
Figure 5:
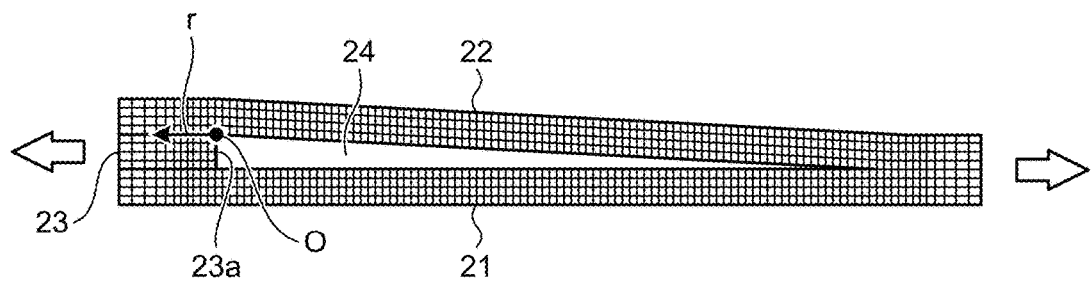
FIG. 5 is an exemplary illustration of the method of designing a composite material according to the first embodiment.

FIG. 1 is a cross-sectional diagram schematically illustrating an exemplary composite material for a method of designing a composite material according to a first embodiment. FIG. 2 is a cross-sectional diagram illustrating stacked structures of a composite material according to the first embodiment. FIG. 3 is a flowchart of the method of designing a composite material according to the first embodiment. FIG. 4 is an exemplary illustration of the method of designing a composite material according to the first embodiment. FIG. 5 is an exemplary illustration of the method of designing a composite material according to the first embodiment.

The method of designing a composite material 1 according to the first embodiment is a technique for optimizing a stacked structure of a thickness-varying part in which the thickness of the composite material 1 changes. This optimization suppresses formation of an excessive thickness to reduce the weight while keeping the strength in the thickness-varying part. First of all, prior to description of the method of designing the composite material 1, the composite material 1 formed by this designing method will be described.

As illustrated in FIG. 1, the composite material 1 is used in various parts of an aircraft and the like and is applicable to, for example, a reinforcement part (which may be referred to as pad-up part) provided at an opening of an aircraft, a joint part for bonding parts of an aircraft, and a section extending from a wing root to a wing tip. That is, the composite material 1 is applicable to any section of an aircraft that has a thickness-varying part. The composite material 1 may be applied to a composite structure other than an aircraft.

The composite material 1 is formed by stacking a plurality of reinforced fiber substrates 1a into a plate shape. The reinforced fiber substrate 1a is formed of reinforced fiber impregnated with resin and is a ply (ply substrate) with the fiber direction of the reinforced fiber aligned in one direction. The orientation angle of the ply is the angle between a reference direction serving as a reference and a fiber direction of the ply in a plane orthogonal to the stacking direction. In other words, when the reference direction and the fiber direction are the same direction, the orientation angle is 0°. In the composite material 1 of the first embodiment, plies with orientation angles of 0°, ±45°, and 90° are used. The plies used are not limited to those having the orientation angles above and, for example, plies with orientation angles of ±15° and ±60° may be used.

As illustrated in FIG. 2, the composite material 1 includes an upper-side stacked structure (one-side stacked structure) 5 including a plurality of reinforced fiber substrates 1a stacked on one side (the upper side in FIG. 2) with respect to a center line I that is a line passing through the center in the stacking direction, and a lower-side stacked structure (the other-side stacked structure) 6 including a plurality of remaining reinforced fiber substrates 1a stacked on the other side (the lower side in FIG. 2) with respect to the center line I. The upper-side stacked structure 5 and the lower-side stacked structure 6 are symmetric stacks in which the orientation angles of the reinforced fiber substrates 1a are symmetric about the center line I.

As illustrated in FIG. 1 and FIG. 2, this composite material 1 has a thick part 11, a thin part 12, and a plate thickness-varying part (thickness-varying part) 13.

The thick part 11 is a section having a first thickness in the stacking direction larger than a second thickness of the thin part 12. As illustrated in FIG. 2, as an example, the thick part 11 is formed by stacking 16 layers of reinforced fiber substrates 1a each serving as one layer. The thin part 12 is a section having a thickness in the stacking direction smaller than the thick part 11. As illustrated in FIG. 2, as an example, the thin part 12 is formed by stacking eight layers of reinforced fiber substrates 1a each serving as one layer (i.e., a first quantity of stacked layers in the thick part being greater than a second quantity of stacked layers in the thin part). The number of stacked layers in the thick part 11 and the thin part 12 is given by way of example and may be changed according to the performance required for the composite material 1. Here, as illustrated in FIG. 2, the section (plane) where the thickness of the thin part 12 extends to the thick part 11 is a baseline 15.

The plate thickness-varying part 13 is provided between the thick part 11 and the thin part 12. The thick part 11, the plate thickness-varying part 13, and the thin part 12 are formed continuously to be integral. The plate thickness-varying part 13 is a section where the thickness in the stacking direction decreases from the thick part 11 toward the thin part 12. As illustrated in FIG. 2, as an example, the plate thickness-varying part 13 has the plate thickness changed by successively reducing eight layers of reinforced fiber substrates 1a such that the plate thickness decreases from the thick part 11 in 16 layers toward the thin part 12 in eight layers.

Specifically, some of the reinforced fiber substrates 1a reduced in the plate thickness-varying part 12 are cut substrates (drop-off layers) 23. The cut substrate 23 has a drop-off portion (cut end) 23a which is an end portion on the thin part 12 side cut along the stacking direction. The cut substrates (drop-off layers) 23 are provided so as to be sandwiched between the reinforced fiber substrates 1a on both sides in the stacking direction. As a plurality (eight drop-off layers) of cut substrates 23 are arranged in the plate thickness-varying part 12, a plurality of (eight) drop-off portions (cut ends) 23a are arranged in the plate thickness-varying part 12. Since the reinforced fiber substrates 1a on the top face and the bottom face in the stacking direction serve as covering layers (connection layers) in the composite material 1, the reinforced fiber substrates 1a on the top face and the bottom face are not cut substrates 23.

Here, eight drop-off portions (cut ends) 23a are denoted as drop-off portion (cut end) 23a1, drop-off portion (cut end) 23a2, . . . , drop-off portion (cut end) 23a8 in order in the direction from the thick part 11 toward the thin part 12 (predetermined direction: the direction from the left side toward the right side in FIG. 2). Here, in the predetermined direction, the drop-off portion (cut end) 23a on the thick side and the drop-off portion (cut end) 23a on the thin side adjacent to the drop-off portion 23a on the thick side are positioned such that one or more layers of reinforced fiber substrates 1a are interposed therebetween. For example, in a case where the drop-off portion cut end) 23a on the thick side is the drop-off portion (cut end) 23a1 and the drop-off portion 23a on the thin side is the drop-off portion (cut end) 23a2, four middle layers (connection layers) of reinforced fiber substrates 1a are stacked between the drop-off portion (cut end) 23a1 and the drop-off portion (cut end) 23a2 in the stacking direction. This positional relation holds in all of a plurality (eight layers) of drop-off portions 23a, that is, between the drop-off portion 23a2 and the drop-off portion 23a3, between the drop-off portion 23a3 and the drop-off portion 23a4, . . . , between the drop-off portion 23a7 and the drop-off portion 23a8. The connection layers (covering layers and middle layers) extend between the thick part and the thin part, and form some of the reinforced fiber layers of the thick part and form all of the reinforced fiber layers of the thin part.

The drop-off portions (cut ends) 23a are arranged in the plate thickness-varying part 13 as described above, so that a plurality of drop-off portions (cut ends) 23a are alternately arranged in the upper-side (first-side) stacked structure 5 and the lower-side (second-side) stacked structure 6 in the predetermined direction. That is, the drop-off portion 23a1, the drop-off portion 23a3, the drop-off portion 23a5, and the drop-off portion 23a7 are arranged in the lower-side stacked structure 6, and the drop-off portion 23a2, the drop-off portion 23a4, the drop-off portion 23a6, and the drop-off portion 23a8 are arranged in the upper-side stacked structure 5. Some of a plurality of cut substrates (drop-off layers) 23 having drop-off portions (cut ends) 23a are included in the baseline 15. Therefore, the drop-off portion 23a is arranged in the baseline 15. Furthermore, as illustrated in FIG. 2, the cut ends 23a (e.g., 23a2 and 23a4, or 23a3 and 23a5) of at least two of the drop-off layers 23 are located on a line parallel to a direction in which at least one of the reinforced fiber layers of the thick part 11 extends.

Referring now to FIG. 3 to FIG. 5, steps in the designing method of designing the composite material 1 described above will be described. In the method of designing the composite material 1 according to the first embodiment, a not-illustrated computer is used to perform stress analysis of the composite material 1 and design the stacked structure of the composite material 1 based on the result of stress analysis.

First, the computer performs a substrate setting process S1 based on operation by an operator. In the substrate setting process S1, in the plate thickness-varying part 13, one layer of reinforced fiber substrate 1a of a plurality of reinforced fiber substrates 1a is set as a base substrate 21, a reinforced fiber substrate 1a opposed to the base substrate 21 is set as a cover substrate 22, and a reinforced fiber substrate 1a positioned between the base substrate 21 and the cover substrate 22 is set as a cut substrate 23 (step S1: substrate setting process). Here, the base substrate 21 and the cover substrate 22 are reinforced fiber substrates 1a extending in the predetermined direction without the drop-off portions 23a on both sides of the cut substrate 23 in the stacking direction. Then, the drop-off portion 23a of the cut substrate 23 is covered with the base substrates 21 and the cover substrate 22 on both sides in the stacking direction to form a pocket 24 which is a space into which resin flows.

In the substrate setting process S1, as illustrated in FIG. 4, a plurality of three-layer stacked structures 31 are set, each including a base substrate 21, a cut substrate 23, and a cover substrate 22. Here, since the reinforced fiber substrates 1a on the top face and the bottom face in the stacking direction are covering layers, a base substrate 21, a cut substrate 23, and a cover substrate 22 are set for the reinforced fiber substrates 1a between the reinforced fiber substrates 1a on the top face and the bottom face. Specifically, the target reinforced fiber substrates 1a are 14 layers of reinforced fiber substrates 1a, and three-layer stacked structures 31 are set so as to be shifted by one layer in the stacking direction, so that 12 sets of stacked structures 31 are set.

Next, the computer performs stress analysis for each of three-layer stacked structures 31 (step S2: evaluation value calculation process). In the evaluation value calculation process S2, as illustrated in FIG. 5, stress analysis is performed by applying stress such as tensile stress along the predetermined direction (in FIG. 5, the interlayer direction) to the three-layer stacked structure 31 including the base substrate 21, the cut substrate 23, and the cover substrate 22, and an evaluation value concerning the degree of stress concentration to the cut substrate 23 is calculated.

As an example, the evaluation value is calculated by Equation (1) below. Here, σ is stress, r is the distance from the origin O illustrated in FIG. 5, λ is index of singularity, and K is a stress coefficient. Stress σ is, for example, but not limited to, shearing stress or von Mises stress. Equation (1) below is given by way of example and not limiting and may include other variables in addition to λ or K.

$$\sigma = (K/r^{\lambda}) \quad (1)$$

In the evaluation value calculation process S2, each of a plurality of cut substrates 23 in a plurality of stacked structures 31 is evaluated based on Equation (1), that is, an evaluation value is calculated considering λ and K. The result of calculation of the evaluation value is illustrated in FIG. 4; for example, evaluation values A to L are calculated for the reinforced fiber substrates 1a set as cut substrates 23. The evaluation values illustrated in FIG. 4 are the initial calculation result. When the cut substrates 23 are set in the cut substrate arrangement process S3 described later, part of the stacked structures of the composite material 1 is changed, and then a new evaluation value is set for the changed part.

Subsequently, the computer is then operated by the operator to set a predetermined reinforced fiber substrate 1a in the plate thickness-varying part 13 as a cut substrate 23, based on the evaluation value (step S3: cut substrate arrangement process). In the cut substrate arrangement process S3, the cut substrates 23 are set such that stress concentration to the plate thickness-varying part 13 is alleviated, based on a plurality of calculated evaluation values. Through the setting as described above, as illustrated in FIG. 2, a plurality of cut substrates 23 having drop-off portions 23a1 to 23a8 are set. In the cut substrate arrangement process S3, in a case where the stacked structure 31 is changed due to the setting of the cut substrate 23, the evaluation value that produces an identical stacked structure 31 may be applied, or stress analysis may be performed again to calculate an evaluation value.

The composite material 1 having the stacked structures illustrated in FIG. 2 is designed by setting the cut substrates 23 as described above.

As described above, according to the first embodiment, an evaluation value for the cut substrate 23 can be calculated by performing stress analysis of the base substrate 21, the cut substrate 23, and the cover substrate 22. In addition, a predetermined reinforced fiber substrate 1a can be set as the cut substrate 23 based on this evaluation value. The reinforced fiber substrate 1a to which stress is less likely to concentrates is set as the cut substrate 23, thereby alleviating concentration of stress in the plate thickness-varying part 13. Here, the amount of change in the plate thickness-varying part 13 can be increased by the amount that can alleviate stress concentration, that is, the thickness of the plate thickness-varying part 13 can be reduced, leading to weight reduction of the composite material 1.

According to the first embodiment, in a case where the plate thickness-varying part 13 includes a plurality of cut substrates 23, a plurality of cut substrates 23 can be set based on a plurality of evaluation values in plurality of reinforced fiber substrates 1a.

According to the first embodiment, the position of the drop-off portion 23a of the cut substrate 23 previously set can be spaced apart from the position of the drop-off portion 23a of the cut substrate 23 set this time. Therefore, even when the composite material 1 is a symmetric stack, the drop-off portions 23a to which stress is likely to concentrate are spaced apart from each other, thereby further alleviating stress concentration on the drop-off portions 23a.

The first embodiment provides the composite material 1 with a smaller weight and in which stress concentration is alleviated.

Second Embodiment

Figure 6:
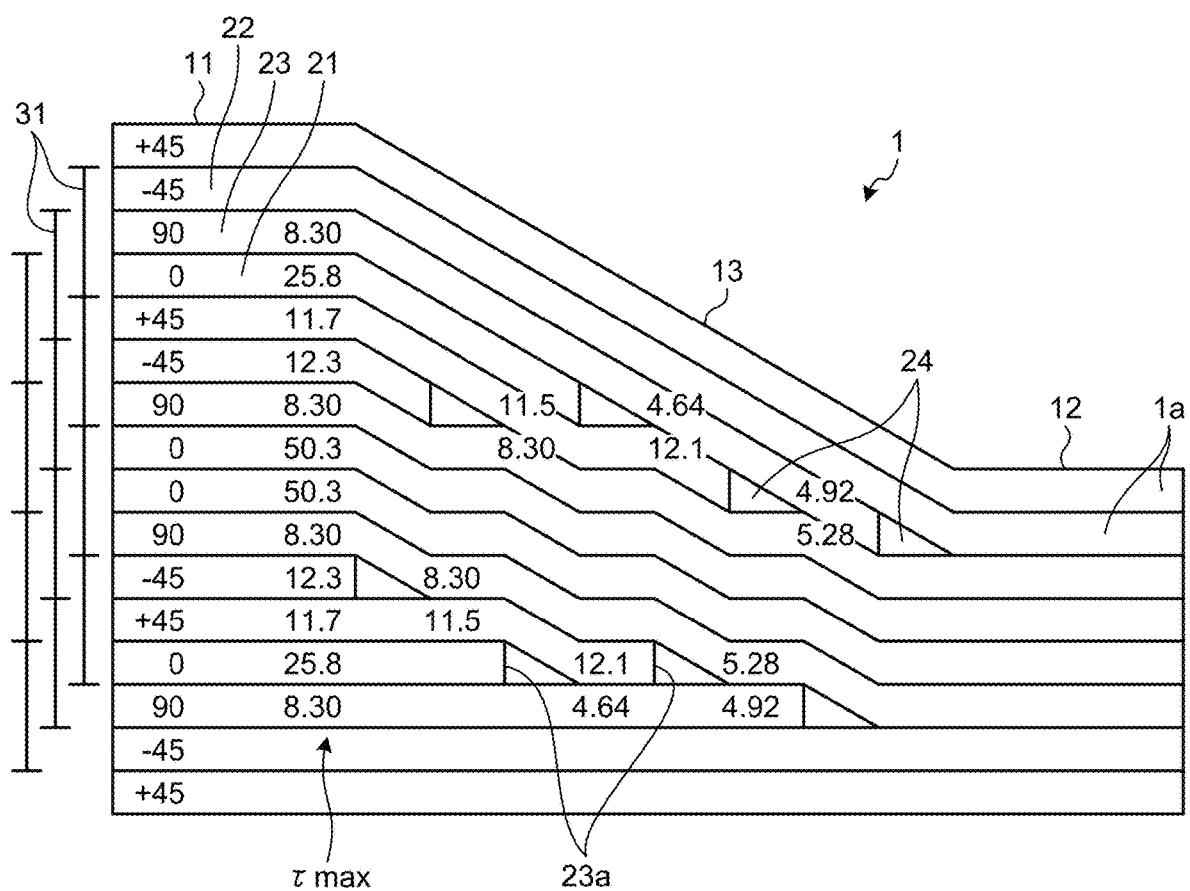
FIG. 6 is an exemplary illustration of the method of designing a composite material according to a second embodiment.
Figure 7:
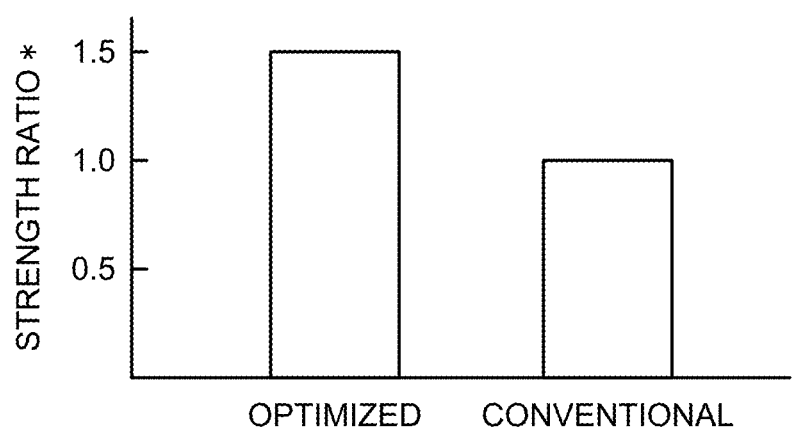
FIG. 7 is a diagram illustrating the effect of the method of designing a composite material according to the second embodiment.
Figure 8:
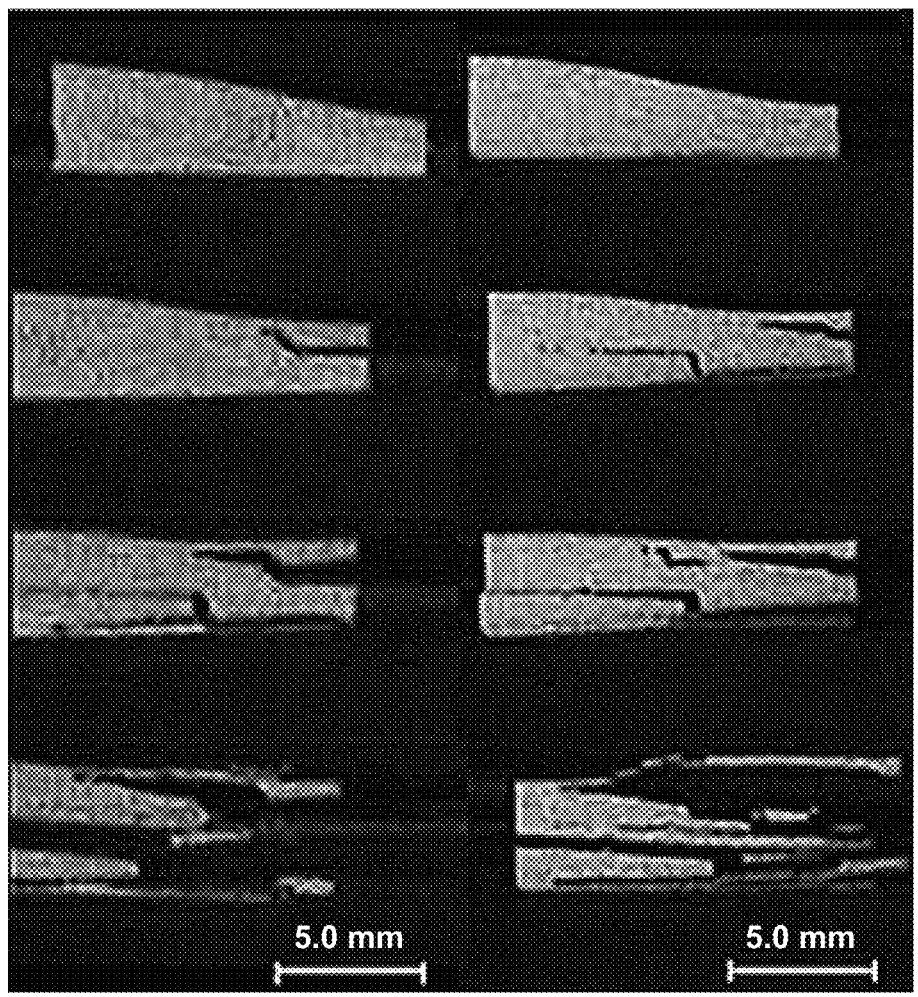
FIG. 8 is a diagram illustrating transition when stress is applied to a composite material according to the second embodiment.
Figure 9:
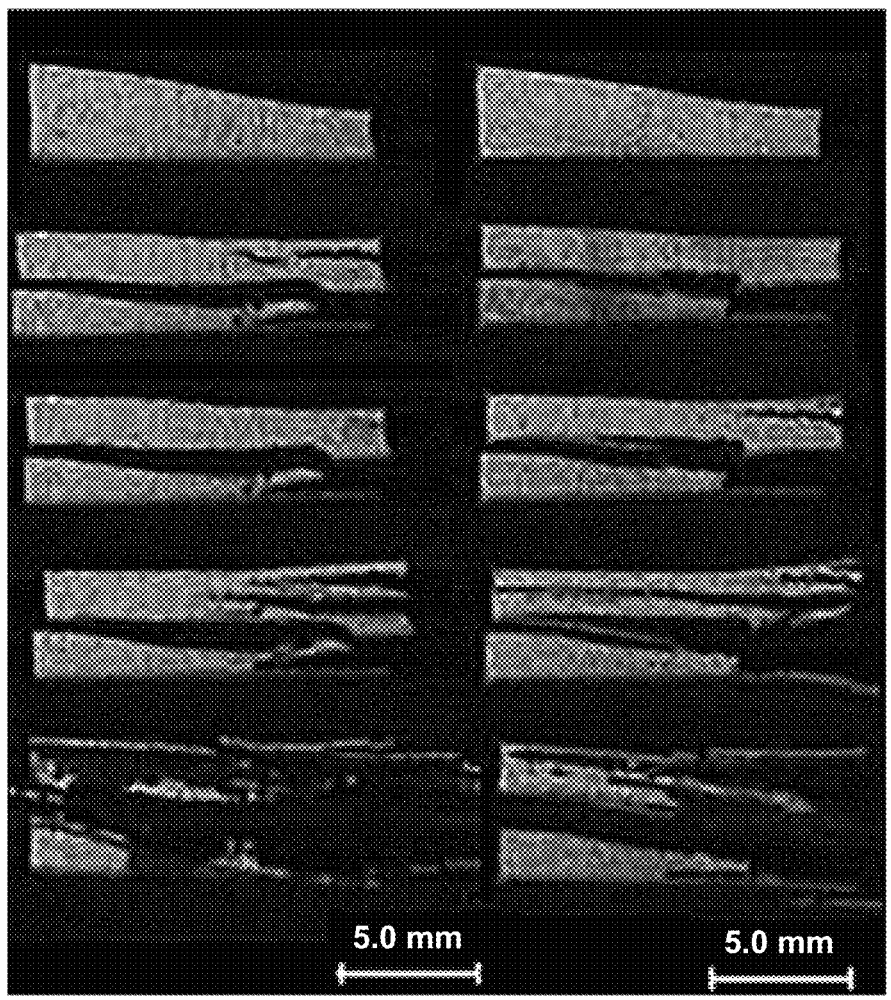
FIG. 9 is a diagram illustrating transition when stress is applied to a composite material designed under poor conditions compared with the composite material of the second embodiment.

Referring now to FIG. 6 to FIG. 9, a method of designing a composite material according to a second embodiment will be described. FIG. 6 is an exemplary illustration of the method of designing a composite material according to the second embodiment. FIG. 7 is a diagram illustrating the effect of the method of designing a composite material according to the second embodiment. FIG. 8 is a diagram illustrating transition when stress is applied to a composite material according to the second embodiment. FIG. 9 is a diagram illustrating transition when stress is applied to a composite material designed under poor conditions compared with the composite material of the second embodiment. The method of designing a composite material according to the second embodiment includes almost the same steps as those in the method of designing a composite material 1 of the first embodiment. In the second embodiment, in order to avoid an overlapping description, parts different from those in the first embodiment will be described, and parts having the same configuration as in the first embodiment are denoted by the same reference signs. In the method of designing a composite material 1 according to the second embodiment, the magnitude of shearing stress $\tau_{max}$ is used as an evaluation value in place of the evaluation value in the $\tau_{max}$ first embodiment. Specifically, the evaluation value is the maximum value of shearing stress determined in the stress analysis.

The method of designing a composite material in the second embodiment includes almost the same steps as in the first embodiment, and as illustrated in FIG. 3, the substrate setting process S1, the evaluation value calculation process S2, and the cut substrate arrangement process S3 are performed in order.

In the substrate setting process S1, as illustrated in FIG. 6, a plurality of three-layer stacked structures 31 each including a base substrate 21, a cut substrate 23, and a cover substrate 22 are set. The substrate setting process S1 is similar to that in the first embodiment and is not further elaborated.

Next, in the evaluation value calculation process S2, as illustrated in FIG. 5, stress analysis is performed by applying stress such as tensile stress along a predetermined direction (in FIG. 5, the interlayer direction) to the three-layer stacked structure 31 including a base substrate 21, a cut substrate 23 and a cover substrate 22, and the maximum value $\tau_{max}$ of shearing stress on the cut substrate 23 is calculated as the evaluation value $\tau_{max}$.

In the evaluation value calculation process S2, the evaluation value $\tau_{max}$ is calculated for each of a plurality of cut substrates 23 in a plurality of stacked structures 31. The calculation results of the evaluation values $\tau_{max}$ are the numerical values illustrated in FIG. 6. The numerical values illustrated in FIG. 6 are the initial calculation results. When the cut substrates 23 are set in the cut substrate arrangement process S3 described later, part of the stacked structures of the composite material 1 is changed, and then a new evaluation value $\tau_{max}$ is set for the changed part. Here, the smaller the numerical value of the evaluation value $\tau_{max}$ is, the lower the magnitude of shearing stress is.

In the cut substrate arrangement process S3, predetermined (in the second embodiment, for example, eight layers) reinforced fiber substrates 1a in the plate thickness-varying part 13 are set as cut substrates 23, and a combination of eight layers of cut substrates 23 makes one set. When a set of combination of cut substrates 23 is set, the stacked structures 31 are changed. Based on this, the evaluation value $\tau_{max}$ is calculated for a plurality of changed stacked structures 31 in the cut substrate arrangement process S3. Then, in the cut substrate arrangement process S3, the sum value which is the sum of a plurality of evaluation values $\tau_{max}$ in a plurality of stacked structures 31 is calculated to derive the magnitude of the entire shearing stress in the plate thickness-varying part 13.

Then, in the cut substrate arrangement process S3, while predetermined reinforced fiber substrates 1a set as cut substrates 23 are changed, a plurality of sum values of a plurality of stacked structures 31 after change are calculated. That is, in the cut substrate arrangement process S3, a plurality of different sets of combination are set by changing the combinations of eight layers of cut substrates 23. Then, in the cut substrate arrangement process S3, the sum value which is the sum of a plurality of evaluation values $\tau_{max}$ in a plurality of stacked structures 31 in each set is calculated.

In the cut substrate arrangement process S3, when a plurality of sum values corresponding to a plurality of sets are calculated, the reinforced fiber substrate 1a in a predetermined set corresponding to the sum value smaller than a preset threshold in a plurality of sum values is selected as a cut substrate 23. Here, the threshold is, for example, but not limited to, the median based on a plurality of sum values or the arithmetic mean derived based on a plurality of sum values. In the cut substrate arrangement process S3, for a predetermined set corresponding to the sum value smaller than the threshold, the one in which the evaluation value $\tau_{max}$ of the cut substrate 23 in the predetermined set is larger on the thick side than on the thin side is selected as the cut substrate 23.

Sets of different combinations of eight layers of cut substrates 23 may be set as appropriate by the operator selecting any given reinforced fiber substrate 1a as the cut substrate 23, or the reinforced fiber substrate 1a may be set as the cut substrate 23 through optimization processing using a genetic algorithm. However, the embodiments are not limited to these examples.

By setting the cut substrates 23 as described above, the composite material 1 is designed such that the magnitude of shearing stress is small as a whole in the plate thickness-varying part 13 and the evaluation value $\tau_{max}$ is large on the thick side compared with the thin side, in other words, the evaluation value $\tau_{max}$ is small on the thin side compared with the thick side.

Referring now to FIG. 7, the strength ratio of the composite material 1 designed based on the designing method in the second embodiment will be described. In FIG. 7, the vertical axis indicates the strength ratio of the composite material 1, and a conventional composite material and the optimized composite material 1 in the first embodiment are illustrated on the horizontal axis. Here, the strength ratio is the strength ratio given when the strength of the conventional composite material is "1". The conventional composite material 1 and the composite material 1 of the first embodiment have the identical shape and differ in the arrangement of the cut substrates 23. As illustrated in FIG. 7, the strength ratio of the conventional composite material is "1", and the strength ratio of the composite material 1 in the second embodiment is about "1.5". Thus, it has been confirmed that when the conventional composite material and the composite material 1 in the second embodiment have the same shape, the strength ratio can be increased by approximately 1.5 times by using the designing method in the second embodiment. In other words, when the conventional composite material and the composite material in the second embodiment have the same strength ratio, the shape of the composite material 1 in the second embodiment can be reduced in thickness compared with the conventional one.

Referring now to FIG. 8 and FIG. 9, the transition of the shape of the composite material 1 when stress is applied to the composite material 1 of the second embodiment will be described. FIG. 8 illustrates a composite material 1 in the second embodiment, and FIG. 9 illustrates a composite material designed under poor conditions compared with the composite material in the second embodiment. In FIG. 8 and FIG. 9, the time transition is from the upper-side to the lower-side, and two similar composite materials are used. As illustrated in FIG. 8, cracking in the composite material 1 originates not from the place where the maximum value $\tau_{max}$ of shearing stress is large but from the vicinity of the cut substrate 23 on the thin part 12 side. This is presumably because the effect of the plate thickness is greater than the effect of the drop-off portion 23a of the cut substrate 23. It is therefore desirable that the cut substrates 23 are arranged such that the evaluation value $\tau_{max}$ is smaller on the thin side than on the thick side. FIG. 9 illustrates the composite material having the cut substrates 23 arranged based on such a poor condition that the evaluation value $\tau_{max}$ is larger on the thin side than on the thick side. Cracking in the composite material 1 originates from the place where the maximum value $\tau_{max}$ of shearing stress on the thin part 12 side is large. Then, in the composite material illustrated in FIG. 9, cracking develops faster than in FIG. 8, and the upper-side stacked structure 5 separates from the lower-side stacked structure 6. FIG. 8 and FIG. 9 have proven that the evaluation value $\tau_{max}$ indicating the maximum value of shearing stress is a value by which actual cracking can be evaluated appropriately.

As described above, according to the second embodiment, when the plate thickness-varying part 13 includes a plurality of cut substrates 23, a plurality of cut substrates 23 that can reduce the evaluation value $\tau_{max}$ of shearing stress as a whole can be selected. Of the selected cut substrates 23, the one with a large evaluation value $\tau_{max}$ is arranged on the thick side to produce a composite material 1 that is less likely to crack. This configuration can improve the shear strength of the plate thickness-varying part 13.

Third Embodiment

Figure 10:
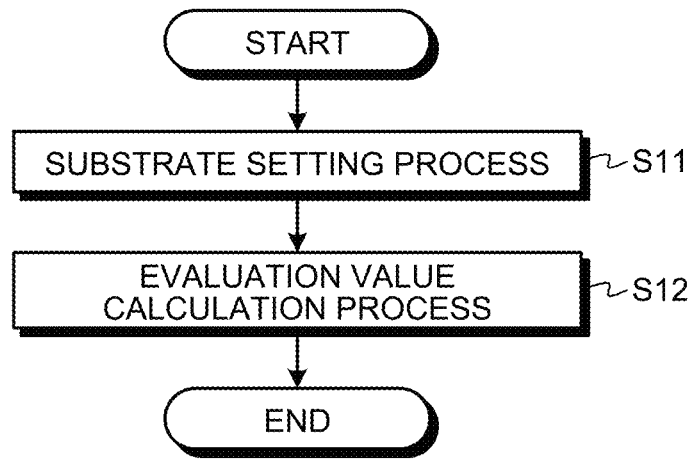
FIG. 10 is a flowchart of a method of evaluating a composite material according to a third embodiment.

Referring now to FIG. 10, a method of evaluating a composite material according to a third embodiment will be described. The method of evaluating a composite material 1 according to the third embodiment is a technique for evaluating the stacked structure of the plate thickness-varying part 13 formed in the existing composite material. This evaluation can be performed to estimate a section where stress is likely to concentrate or a section subject to large shearing stress. Here, the method of evaluating a composite material according to the third embodiment includes the same steps as in the method of designing a composite material 1 in the first embodiment or the second embodiment. In order to avoid an overlapping description, in the third embodiment, parts different from those in the first embodiment and the second embodiment will be described, and parts having the same configuration as in the first embodiment and the second embodiment are denoted by the same reference signs. FIG. 10 is a flowchart of the method of evaluating a composite material according to the third embodiment.

The method of evaluating a composite material according to the third embodiment includes the substrate setting process S11 similar to that in the first embodiment and the second embodiment and the evaluation value calculation process S12 similar to that in the first embodiment or the evaluation value calculation process S12 similar to that in the second embodiment. That is, in the method of evaluating a composite material, a plurality of three-layer stacked structures 31 each including a base substrate 21, a cut substrate 23 and a cover substrate 22 are set, stress analysis is performed on the set stacked structures 31, and the evaluation value or the evaluation value $\tau_{max}$ is calculated for the cut substrate 23, in the same manner as in the first embodiment or the second embodiment. Then, the section where stress is likely to concentrate is estimated based on these evaluation values, or the section with high shearing stress is estimated based on the evaluation value $\tau_{max}$.

As described above, according to the third embodiment, the degree of stress concentration on the existing composite material 1 or the magnitude of shearing stress can be evaluated. Then, for the composite material 1 formed by stacking a plurality of reinforced fiber substrates 1a, the strength of the composite material 1 can be evaluated through stress analysis of the three-layer stacked structure 31 including a base substrate 21, a cut substrate 23, and a cover substrate 22.

REFERENCE SIGNS LIST

1 Composite material
1a Reinforced fiber substrate
5 Upper-side stacked structure
6 Lower-side stacked structure
11 Thick part
12 Thin part
13 Plate thickness-varying part
15 Baseline
21 Base substrate
22 Cover substrate
23 Cut substrate
23a (23a1 to 23a8) Drop-off portion
24 Pocket
31 Stacked structure

The invention claimed is:

1. A composite material comprising:
a thick part including a first quantity of stacked reinforced fiber layers, the thick part having a first thickness;
a thin part including a second quantity of stacked reinforced fiber layers, the first quantity being greater than the second quantity, the thin part having a second thickness less than the first thickness; and
a thickness-varying part between the thick part and the thin part and having a thickness decreasing from the first thickness to the second thickness,
wherein the thickness-varying part includes:
a plurality of connection layers forming some of the stacked reinforced fiber layers of the thick part and forming all of the stacked reinforced fiber layers of the thin part; and
a plurality of drop-off layers forming some of the reinforced fiber layers of the thick part, each of the plurality of drop-off layers extending from the thick part and having a cut end within the thickness-varying part,
wherein the cut ends of the plurality of drop-off layers are displaced from each other along a direction from the thick part to the thin part,
wherein each of the stacked reinforced fiber layers of the thick part, each of the stacked reinforced fiber layers of the thin part, and each of the stacked reinforced fiber layers of the thickness-varying part is a ply substrate having a fiber direction aligned in one direction,
wherein, in a plane orthogonal to a stacking direction in which the reinforced fiber layers of each of the thick part, the thin part, and the thickness-varying part are stacked, an angle formed between a reference direction and the fiber direction of each ply substrate is an orientation angle, and
wherein the plurality of drop-off layers comprises a pair of adjacent drop-off layers including a first ply substrate and a second ply substrate contacting each other, and the orientation angle of the first ply substrate of the pair of adjacent drop-off layers is different than the orientation angle of the ply substrate of the pair of adjacent drop-off layers.

2. The composite material according to claim 1, wherein the composite material comprises:
a first-side stacked structure including the reinforced fiber layers stacked on a first side of a center line connecting centers of the thick part, the thin part, and the thickness-varying part in the stacking direction; and
a second-side stacked structure including the remaining reinforced fiber layers stacked on a second side with respect to the center line,
wherein the first-side stacked structure and the second-side stacked structure are a symmetric stack in which an orientation angle of the reinforced fiber layers is symmetric about the center line, and
wherein the plurality of drop-off layers are disposed in at least one of the first-side stacked structure and the second-side stacked structure in a direction from a thick part side to a thin part side of the thickness-varying part.

3. The composite material according to claim 2, wherein the plurality of drop-off layers are alternately disposed in the first-side stacked structure and the second-side stacked structure in a direction from the thick part side to the thin part side of the thickness-varying part.

4. The composite material according to claim 1, wherein a plane in which a thickness of the thin part extends to the thick part is defined as a baseline, and at least one of the plurality of drop-off layers is on the baseline.

5. The composite material according to claim 1, wherein the cut ends of at least two of the drop-off layers are located on a line parallel to a direction in which at least one of the reinforced fiber layers of the thick part extends.

6. The composite material according to claim 1, wherein the plurality of drop-off layers comprises at least four drop-off layers.

7. The composite material according to claim 1, wherein at least one of the connection layers forming some of the stacked reinforced fiber layers is interposed between the plurality of drop-off layers with respect to a stacking direction in which the reinforced fiber layers of each of the thick part, the thin part, and the thickness-varying part are stacked.

8. The composite material according to claim 1, wherein the ply substrate of the first one of the adjacent pair is directly above the ply substrate of the second one of the adjacent pair, and
wherein the ply substrate of the first one of the adjacent pair and the ply substrate that is directly below the ply substrate of the second one of the adjacent pair extend in contact with each other on a thin part side of the thickness-varying part with respect to the cut end of the ply substrate of the second one of the adjacent pair.

9. A composite material comprising:
a thick part including a first quantity of stacked reinforced fiber layers, the thick part having a first thickness;
a thin part including a second quantity of stacked reinforced fiber layers, the first quantity being greater than the second quantity, the thin part having a second thickness less than the first thickness; and
a thickness-varying part between the thick part and the thin part and having a thickness decreasing from the first thickness to the second thickness,
wherein the thickness-varying part includes:
a plurality of connection layers forming some of the stacked reinforced fiber layers of the thick part and forming all of the stacked reinforced fiber layers of the thin part; and
a plurality of drop-off layers forming some of the reinforced fiber layers of the thick part, each of the plurality of drop-off layers extending from the thick part and having a cut end within the thickness-varying part,
wherein the cut ends of the plurality of drop-off layers are displaced from each other along a direction from the thick part to the thin part,
wherein each of the stacked reinforced fiber layers of the thick part, each of the stacked reinforced fiber layers of the thin part, and each of the stacked reinforced fiber layers of the thickness-varying part is a ply substrate having a fiber direction aligned in one direction,
wherein, in a plane orthogonal to a stacking direction in which the reinforced fiber layers of each of the thick part, the thin part, and the thickness-varying part are stacked, an angle formed between a reference direction and the fiber direction of each ply substrate is an orientation angle, and
wherein the orientation angle of the ply substrate of a first drop-off layer of an adjacent pair of the drop-off layers is different than the orientation angle of the ply substrate of a second drop-off layer of the adjacent pair of the drop-off layers,
wherein the ply substrate of the first drop-off layer of the adjacent pair of the drop-off layers is directly above the ply substrate of the second drop-off layer of the adjacent pair of the drop-off layers, and wherein the ply substrate of the first drop-off layer of the adjacent pair of the drop-off layers and the ply substrate of a reinforced fiber layer directly below the ply substrate of the second drop-off layer of the adjacent pair of the drop-off layers extend in contact with each other on a side of the thickness-varying part closer to the thin part relative to a cut end of the ply substrate of the second drop-off layer of the adjacent pair of the drop-off layers.

10. The composite material according to claim 9, wherein the composite material comprises:

a first-side stacked structure including the reinforced fiber layers stacked on a first side of a center line connecting centers of the thick part, the thin part, and the thickness-varying part in the stacking direction; and a second-side stacked structure including the remaining reinforced fiber layers stacked on a second side with respect to the center line, wherein the first-side stacked structure and the second-side stacked structure are a symmetric stack in which an orientation angle of the reinforced fiber layers is symmetric about the center line, and wherein the plurality of drop-off layers are disposed in at least one of the first-side stacked structure and the second-side stacked structure in a direction from a thick part side to a thin part side of the thickness-varying part.

11. The composite material according to claim 10, wherein the plurality of drop-off layers are alternately disposed in the first-side stacked structure and the second-side stacked structure in a direction from the thick part side to the thin part side of the thickness-varying part.

12. The composite material according to claim 9, wherein a plane in which a thickness of the thin part extends to the thick part is defined as a baseline, and at least one of the plurality of drop-off layers is on the baseline.

13. The composite material according to claim 9, wherein the cut ends of at least two of the drop-off layers are located on a line parallel to a direction in which at least one of the reinforced fiber layers of the thick part extends.

14. The composite material according to claim 9, wherein the plurality of drop-off layers comprises at least four drop-off layers.

15. The composite material according to claim 9, wherein at least one of the connection layers forming some of the stacked reinforced fiber layers is interposed between the plurality of drop-off layers with respect to a stacking direction in which the reinforced fiber layers of each of the thick part, the thin part, and the thickness-varying part are stacked.

* * * * *